(12) United States Patent
Kanie et al.

(10) Patent No.: US 11,512,797 B2
(45) Date of Patent: Nov. 29, 2022

(54) CLIP ASSEMBLY FOR CYLINDRICAL COMPONENT

(71) Applicant: ILLINOIS TOOL WORKS INC., Glenview, IL (US)

(72) Inventors: Hideki Kanie, Tokyo (JP); Norikaze Imazu, Toyota (JP)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/150,030

(22) Filed: Jan. 15, 2021

(65) Prior Publication Data

US 2021/0222801 A1    Jul. 22, 2021

(30) Foreign Application Priority Data

Jan. 17, 2020    (JP) ............................. JP2020-006185

(51) Int. Cl.
  *F16L 3/13*    (2006.01)
  *H02G 3/32*    (2006.01)
  *F16L 3/227*   (2006.01)
  *F16L 3/00*    (2006.01)

(52) U.S. Cl.
  CPC ................. *F16L 3/13* (2013.01); *F16L 3/227* (2013.01); *H02G 3/32* (2013.01); *F16L 3/00* (2013.01)

(58) Field of Classification Search
  CPC ... F16L 3/13; F16L 3/227; F16L 3/137; F16L 3/00; F16L 3/02; F16L 3/18; H02G 3/32
  USPC ............. 248/73, 74.1, 74.2, 74.3, 74.4, 74.5
  See application file for complete search history.

(56) References Cited

U.S. PATENT DOCUMENTS

| | | | | |
|---|---|---|---|---|
| 3,286,963 A | * | 11/1966 | Bergman | .................. F16L 3/10 248/74.2 |
| 3,894,706 A | * | 7/1975 | Mizusawa | ............. F16L 3/2235 248/68.1 |
| 3,944,177 A | * | 3/1976 | Yoda | ......................... F16L 3/08 248/74.2 |
| 4,614,321 A | * | 9/1986 | Andre | ................... F16B 5/0685 24/555 |
| 4,700,913 A | * | 10/1987 | Hirano | ................ B60R 16/0215 24/543 |
| 4,840,334 A | * | 6/1989 | Kikuchi | ..................... F16L 3/13 24/453 |
| 5,257,768 A | * | 11/1993 | Juenemann | ........... F16L 55/035 248/604 |
| 7,278,190 B2 | * | 10/2007 | Fischer | ...................... F16L 3/13 24/530 |
| 7,938,371 B2 | * | 5/2011 | Oga | ........................ F16L 3/1025 248/74.4 |
| 8,157,223 B2 | * | 4/2012 | Stau | ........................ F16L 3/237 248/74.2 |
| 8,356,778 B2 | * | 1/2013 | Birli | ........................ F16L 3/243 248/73 |
| 8,668,174 B2 | * | 3/2014 | Kato | ........................ F16L 3/222 248/74.2 |

(Continued)

*Primary Examiner* — Nkeisha Smith
(74) *Attorney, Agent, or Firm* — Quarles & Brady LLP

(57) ABSTRACT

A clip assembly for retaining a cylindrical component includes an insert having a retention channel in which a cylindrical component is accepted, and a holder into which the insert is fitted. The insert and the holder are fitted together by pushing the insert in a fitting direction that is perpendicular to a central axis of the cylindrical component received in the channel.

16 Claims, 15 Drawing Sheets

(56) References Cited

U.S. PATENT DOCUMENTS

| | | | | |
|---|---|---|---|---|
| 8,910,912 | B2* | 12/2014 | Child | F16L 3/2235 |
| | | | | 248/73 |
| 9,004,416 | B2* | 4/2015 | Ogawa | F16L 3/13 |
| | | | | 248/74.2 |
| 9,016,639 | B2* | 4/2015 | Kuhm | F16L 3/1203 |
| | | | | 248/68.1 |
| 9,127,740 | B2* | 9/2015 | Shinoda | F16L 3/02 |
| 9,181,966 | B2* | 11/2015 | Ogawa | B60R 16/0215 |
| 9,512,612 | B2* | 12/2016 | Gower | E04B 1/40 |
| 9,541,223 | B2* | 1/2017 | Meyers | F16L 55/035 |
| 10,527,202 | B2* | 1/2020 | Kanie | F16L 3/13 |
| 10,557,569 | B2* | 2/2020 | Meyers | B29C 45/2628 |
| 2002/0011542 | A1* | 1/2002 | Winton, III | H02G 3/30 |
| | | | | 248/74.1 |
| 2005/0098688 | A1* | 5/2005 | Miarka | F16L 3/223 |
| | | | | 248/68.1 |
| 2005/0127248 | A1* | 6/2005 | Suzuki | F16L 55/035 |
| | | | | 248/68.1 |
| 2010/0116947 | A1* | 5/2010 | Winkler | F16L 3/13 |
| | | | | 248/73 |
| 2012/0318935 | A1* | 12/2012 | Benedetti | F16L 3/1075 |
| | | | | 248/74.1 |
| 2014/0201954 | A1* | 7/2014 | Kuhm | F16L 3/13 |
| | | | | 24/132 AA |
| 2015/0377387 | A1* | 12/2015 | Meyers | B60R 16/0215 |
| | | | | 248/74.2 |
| 2018/0187798 | A1 | 7/2018 | Kanie et al. | |

* cited by examiner

CLIP ASSEMBLY FOR CYLINDRICAL COMPONENT

CROSS REFERENCE TO RELATED APPLICATIONS

This application relates to and claims priority benefits from Japanese Patent No. 2020-006185, filed on Jan. 17, 2020, which is incorporated by reference in its entirety herein.

TECHNICAL FIELD

The present invention relates to a clip assembly for a cylindrical component for retaining and affixing a cylindrical component such as a pipe, tube, wire, or rod.

BACKGROUND

Retention devices, which are also commonly referred to as "clips", have conventionally been used to secure components such as flexible tubes, rigid tubes, wires, rods, etc., to various assemblies. This type of retention device is widely used in particular for the arrangement of fuel pipes, brake pipes, wires, etc., in the automobile industry. For example, U.S. Pat. Pub. No. 2018/187798 ("Patent Literature 1") describes a routing clip assembly as an example of such a retention device.

In the routing clip assembly described in Patent Literature 1, there are provided a plurality of inserts which are arranged within a housing and which accept tubular components. The tubular components arranged within the inserts are pressed towards the inserts by four claws (prongs) arranged above the insert, and as a result, the tubular components are retained between the inserts and claws.

SUMMARY

Though the routing clip assembly described in Patent Literature 1 can retain a plurality of tubular components, since the claws have a certain degree of flexibility to force the tubular components beyond the claws toward the insert, the tubular components retained in the routing clip assembly vibrate due to engine vibrations or the like. Conversely, if the claws are hardened in order to prevent vibration, there is a problem that it becomes difficult to press the tubular components.

The present invention aims to solve such problems of the prior art, and an object of the present invention is to provide a clip assembly for a cylindrical component which facilitates pressing of a cylindrical component into the clip assembly while enabling more firm retention of the cylindrical component.

In order to achieve the above object, according to the present invention, there is provided a clip assembly for retaining a cylindrical component comprising an insert having a retention channel which accepts the cylindrical component, and a holder in which the insert is fitted, wherein the insert and the holder are formed such that by pushing the insert into the holder in a fitting direction perpendicular to a central axis of the cylindrical component received in the channel, the insert and the holder are fitted together and the insert is retained by the holder from the outside.

According to the present invention, by fitting the insert in the holder, since the insert, which receives the cylindrical component, is retained from the outside by the holder, the cylindrical component can be firmly retained even if the insert is made of a flexible material.

BRIEF DESCRIPTION OF DRAWINGS

These and other features and advantages of the present disclosure may be better understood by reading the following detailed description with reference to the accompanying drawings. The same reference numerals represent the same components throughout the accompanying drawings, in which:

FIG. 2A is an enlarged view of a portion of the cross-sectional view of the clip assembly of FIG. 2 illustrating portions of an insert and a holder in greater detail;

DETAILED DESCRIPTION OF EMBODIMENTS

Figure 1:
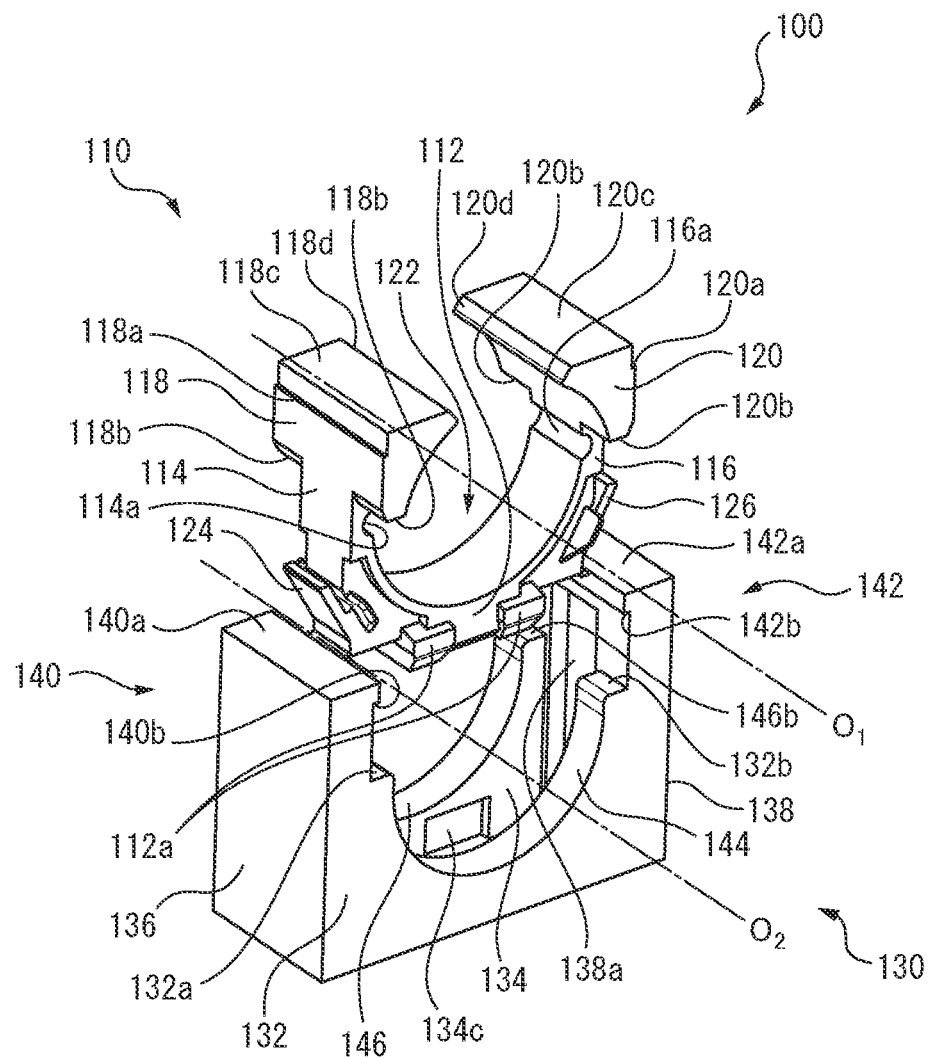
FIG. 1 is a perspective view of a clip assembly according to a first embodiment of the present invention.

The preferred embodiments of the present invention will be described below with reference to the attached drawings. It should be noted that in the following description, the direction of the central axes O1, O2 of the clip assembly is the front-back direction, the fitting direction (the direction in which the insert 110 is pressed into the holder 13 when the insert 110 is fitted into the holder 130) V of the insert 110 is the up-down direction, and the direction orthogonal to the front-back direction and the up-down direction is the left-right direction. The central axes O1, O2 each define a respective horizontal plane O1H, O2H and a respective vertical plane O1V, O2V that is perpendicular to the respective horizontal plane O1H, O2H.

In FIGS. 1 to 8, the clip assembly 100 according to the first embodiment includes an insert 110 and a holder 130, and retains a cylindrical component 160 extending along the central axis O. The insert 110 and the holder 130 have central axes O1, O2, respectively. The insert 110 is fitted into and integrates with the holder 130 by pushing it in the fitting direction V with respect to the holder 130. The holder 130 can be affixed to a stationary member such as a frame or panel. Note that the cylindrical component 160 is a hollow or solid member such as a pipe, a tube, a wire, or a rod.

The insert 110 has a base part 112 and a pair of arms 114, 116 extending from the sides of the base part 112. The arms 114, 116 have respective heads 118, 120 formed on the ends thereof. The insert 110 is a member having a substantially C shape with an open upper portion, and can be integrally formed from a plastic material such as polyacetal, polyamide, or polypropylene. The arms 114, 116 of the insert 110 form a retention channel 122 in which the cylindrical component 160 is retained. Notches 114a, 116a extending in the central axis O1 direction may be formed in the inner surfaces of the arms 114, 116.

The inner peripheral surface of the retention channel 122 is formed so as to contact with the outer peripheral surface of the cylindrical component 160 to be retained. The inner peripheral surface of the retention channel 122 can be formed from a part of a substantially cylindrical surface centered on the central axis O1. Each of the heads 118, 120 of the arms 114, 116 contacts the outer surface, which is the upper side, of the outer peripheral surface of the cylindrical component 160 arranged in the channel 122, i.e., the outer surface which is the rear side of the cylindrical component 160 when viewed in the fitting direction V, and press the cylindrical component 160 downward from above.

The base part 112 is formed with protrusions protruding from the front and back. Furthermore, though only the front protrusions 112a formed on the front surface of the base part 112 is shown in FIGS. 1, 3, 5, and 6, the protrusions also include back protrusions similarly formed on the back surface of the base part 112. The base part 112 also has a pair of hook parts 124, 126 which extend diagonally upward from the base part 112 symmetrically when the insert 110 is viewed from the front or the back. The hook parts 124, 126 are arranged outside the arms 114, 116. Preferably, the hook parts 124,126 extend obliquely upward from the ends of the base part 112.

The heads 118, 120 are formed on the tips (upper ends) of the arms 114, 116. The heads 118, 120 project in the front-rear direction from the arms 114, 116, and are substantially T-shaped in a side view. Contact parts 118b, 120b are formed by the portions of the heads 118, 120 protruding in the front-rear direction. The inner peripheral surfaces of the heads 118, 120 are formed so as to be in contact with the peripheral surface of the cylindrical component to be retained, and form a part of the retention channel 122.

The holder 130 has a front wall 132 and a rear wall 134 arranged in parallel, and side walls 136, 138 extending between the front wall 132 and rear wall 134 and connecting the two. The front wall 132 and the rear wall 134 have respective channels 144, 146 which can contact the outer peripheral surface of the cylindrical component 160 to be retained, and are formed in a substantially U shape. The channels 144, 146 are formed in an arc shape or a semicircular shape around the central axis O2. Stop surfaces 132a, 132b; 134a, 134b are formed on the ends of the channels 144, 146 in the circumferential direction.

The arms 140, 142 are formed by the front wall 132, the rear wall 134 and the side walls 136, 138. Grooves 136a and 138a extending in the fitting direction V perpendicular to the central axis O2 are formed in the inner surfaces of the arms 140, 142 facing each other. In the arms 140, 142, the end surfaces 140a, 142a, which are the rear ends when viewed in the fitting direction V, are preferably arranged in the same plane perpendicular to the fitting direction V.

Further, recesses are formed in the portions of the front wall 132 and rear wall 134 (the base portion of the holder) that face the base part 112 of the insert 110 (the base part of the holder), so that when the insert 110 is fitted into the holder 130, the protrusions (front protrusions 112a and back protrusions 112a) engage in the recesses. Though only the back recesses 134c formed in the rear wall 134 of the holder 130 are shown in the attached drawings, in particular FIGS. 1, 3, 5 and 6, the recesses also include front recesses (not illustrated) similarly formed in the inner surface of the front wall 132.

The mode of operation of the present embodiment will be described below.

Figure 2:
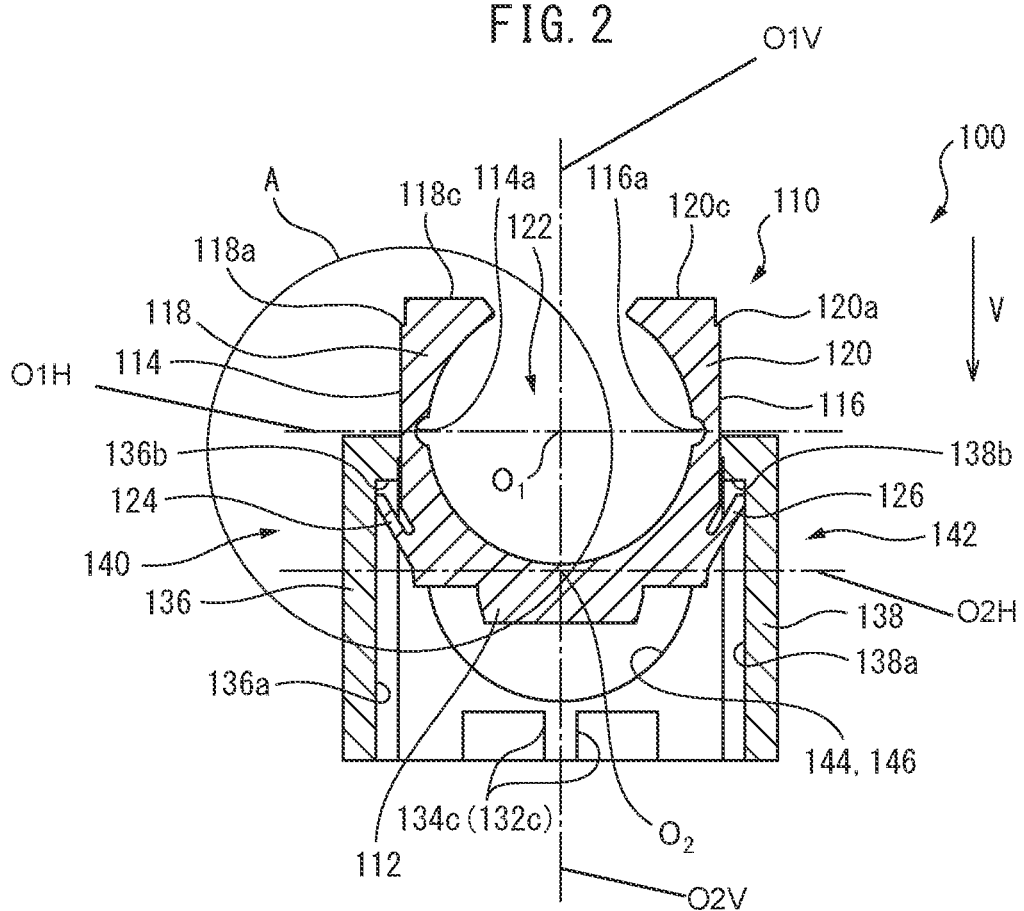
FIG. 2 is a front elevational cross-sectional view of the clip assembly of FIG. 1.
Figure 3:
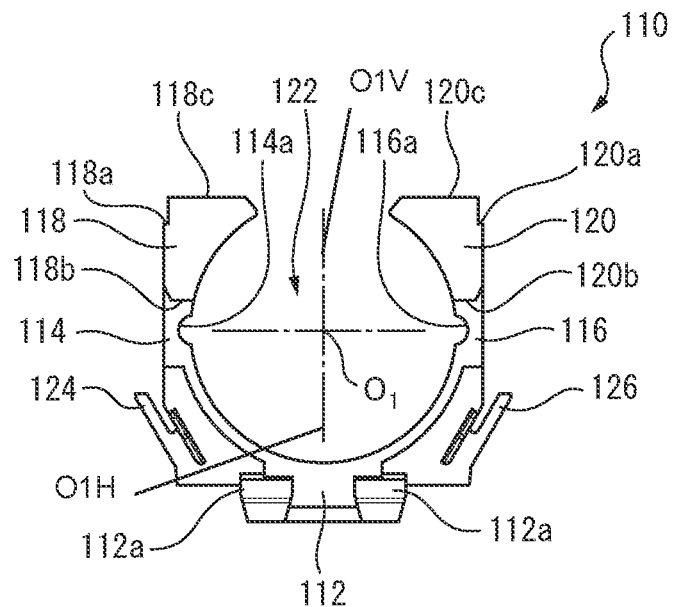
FIG. 3 is a front elevational view of the insert of the clip assembly of FIG. 1.
Figure 4:
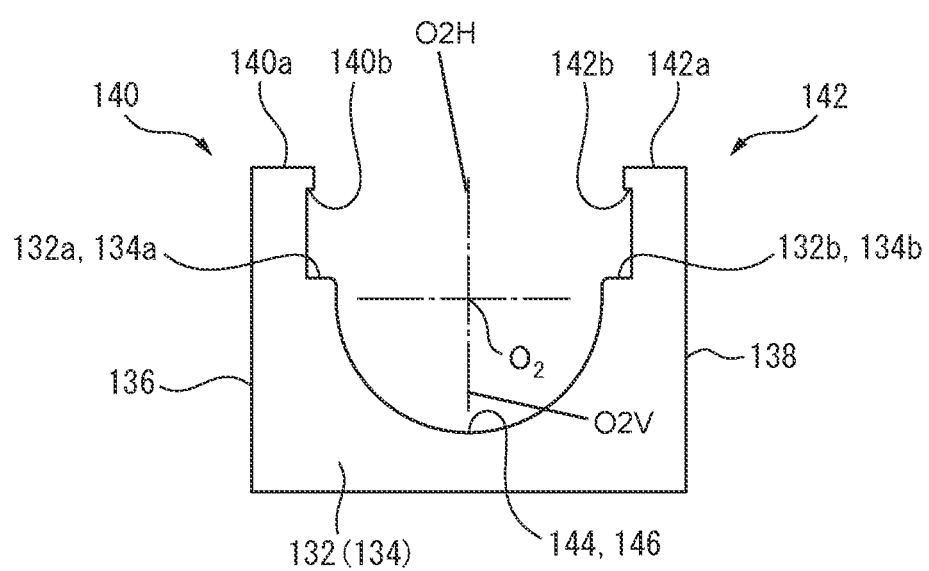
FIG. 4 is a front elevational view of the holder of the clip assembly of FIG. 1.

The insert 110 is positioned relative to the holder 130 so that the base part 112 is located between the arms 140, 142 of the holder 130, as shown in FIG. 1, and it is fitted into the holder 130 by pushing it in the direction indicated by arrow V perpendicular to the central axis O. At that time, as shown in FIGS. 2 and 2a, the tips of the hook parts 124, 126 of the insert 110 pass shoulders 140b, 142b of the upper ends of the arms 140, 142 of the holder 130 and are accepted by the grooves 136a, 138a. As a result, the insert 110 is positioned in the front-rear direction with respect to the holder 130.

Furthermore, when the hook parts 124, 126 of the insert 110 are received in the grooves 136a, 138a of the holder 130, the hook parts 124, 126 can move along the grooves 136a, 138a but cannot move beyond the walls 136b, 138b at the upper ends of the grooves 136a, 138a to be removed from the grooves 136a, 138a, and as a result, the insert 110 cannot be separated from the holder 130.

Figure 5:
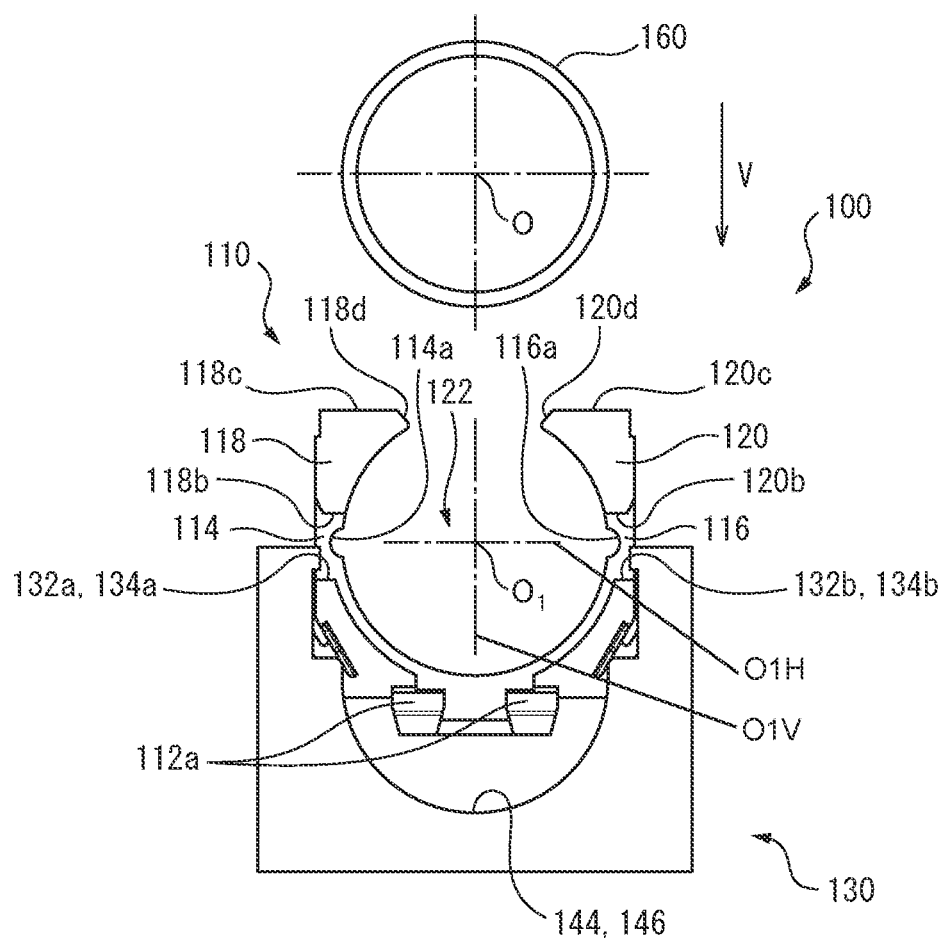
FIG. 5 is a front elevational view of a clip assembly and a cylindrical component to be retained by the clip assembly.
Figure 6:
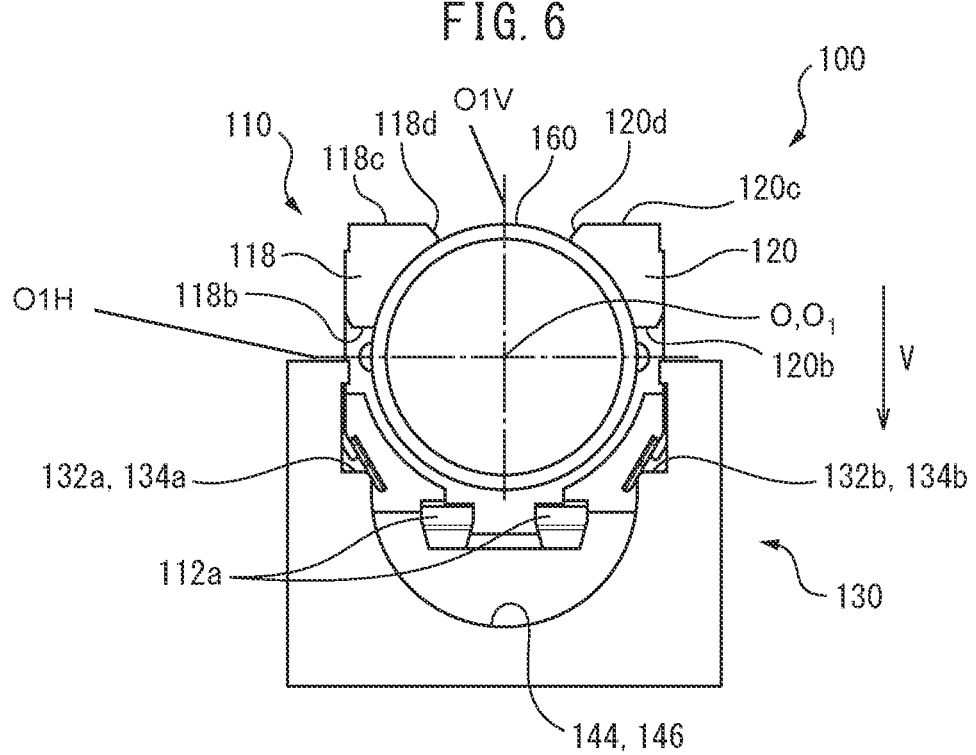
FIG. 6 is a front elevational view of a clip assembly and a cylindrical component fitted into an insert.

As shown in FIGS. 2 and 2a, the insert 110 and the holder 130 are prepared in combination, and the cylindrical component 160 is placed above the opening between the heads 118, 120 of the insert 110 (FIG. 5). The cylindrical component 160 is then pressed in the fitting direction V toward the opening between the heads 118, 120, whereby the cylindrical component 160 is pushed into the retention channel 122 of the insert 110 (FIG. 6). At this time, by providing the notches 114a, 116a, the arms 114, 116 can be easily expanded outward, and the cylindrical component 160 can easily be pushed into the retention channel 122.

Figure 7:
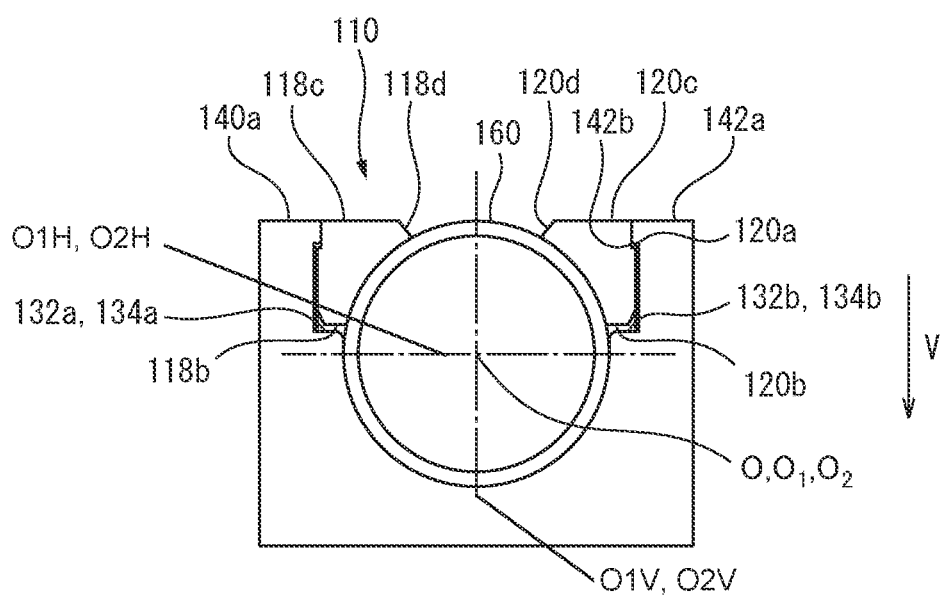
FIG. 7 is a front elevational view of a clip assembly and a cylindrical component retained by the clip assembly.
Figure 8:
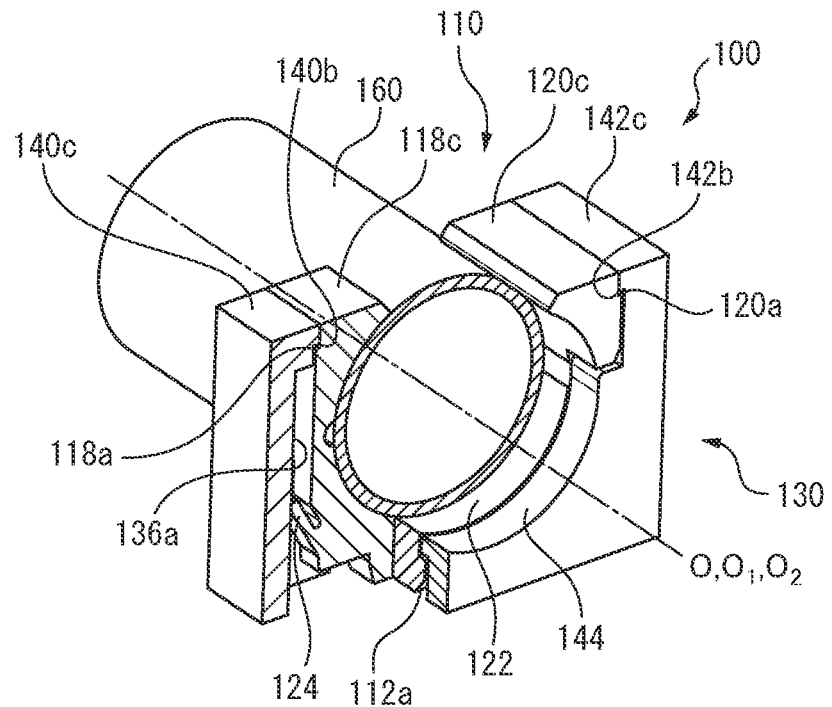
FIG. 8 is a partial cross-sectional perspective view of the clip assembly and the cylindrical component of FIG. 7.

When the insert 110 is further pressed in the fitting direction V along with the cylindrical component 160, the insert 110 is fitted into the holder 130 in a state in which the cylindrical component 160 is retained in the retention channel 112 thereof (FIGS. 7 and 8). At this time, the contact parts 118b, 120b of the heads 118, 120 of the insert 110 abut the stop surfaces 132a, 132b; 134a, 134b of the holder 130 and the shoulders 118a, 120a of the heads 118, 120 engage with the shoulders 140b, 142b of the arms 140, 142 of the holder 130. As a result, the arms 114, 116 of the insert 110 are affixed to the arms 140, 142 of the holder 130.

Further, the protrusions (front protrusions 112a and back protrusions) of the base part 112 of the insert 110 engage with the recesses (front recesses 132c and back recesses 134c) of the holder 130, and as a result, the base part 112 of the insert 110 is affixed to the base portion of the holder 130. Thus, the insert 110 is fitted into and affixed in the holder 130 in a state in which the cylindrical component 160 is retained in the retention channel 112.

In the present embodiment, the shoulders 118a, 120a of the heads 118, 120 of the insert 110, which engage with the shoulders 140b, 142b of the holder 130, and the protrusions of the base part 112 of the insert 110, which engage with the recesses of the holder 130, form a locking part for retaining the fitted state of the insert 110 and the holder 130.

At this time, when the insert 110 and the holder 130 are fitted with each other, as described above, in a state in which the cylindrical component 160 is retained in the retention channel 122, the central axis O of the cylindrical component 160, the central axis O1 of the insert 110, and the central axis O2 of the holder 130 coincide with each other, and the inner peripheral surface of the retention channel 122 of the insert 110 coincides with the inner peripheral surface of the channel 144 of the holder 130.

Furthermore, when the insert 110 and the holder 130 are fitted with each other, in the present embodiment, the surfaces (rear end surfaces) 118c, 120c of the heads 118, 120 of the arms 114, 116 of the insert 110, which are the rear ends when viewed in the fitting direction V, are arranged in substantially the same plane as the end surfaces 140a, 142a of the arms 140, 142 of the holder 130, as shown in FIGS. 7 and 8. Specifically, when the insert 110 is fitted into the holder 130 in a state in which the cylindrical component 160 is retained in the retention channel 122, the insert 110 has a rear end surface which is arranged in substantially the same plane as the rear end surface of the holder 130 on the rear side when viewed in the fitting direction V. Further, this plane is preferably in contact with the outer surface of the cylindrical component 160 retained in the clip assembly 100.

Furthermore, in the present embodiment, when the insert 110 is fitted into the holder 130 in a state in which the cylindrical component 160 is received, since the insert 110 is entirely retained by the holder 130 so as to be urged from the outside toward the center axis O of the cylindrical component 160, even if the insert 110 is made of a flexible material, the cylindrical component 160 can be firmly retained.

Further, in the routing clip assembly of Patent Literature 1, since the tubular part is pressed toward the insert by the claws from above, the vertical dimension (height) of the routing clip assembly for inserting the tubular part thereinto is relatively large. However, in the present embodiment, the entirety of the insert 110 is retained from the outside by the holder 130, and at this time, since the heads 118, 120 retain the outer surface above the central axis O of the cylindrical component 160 (the outer surface of the cylindrical component 160 on the rear side when viewed in the fitting direction V) from above, the height of the clip assembly can be reduced.

Figure 9:
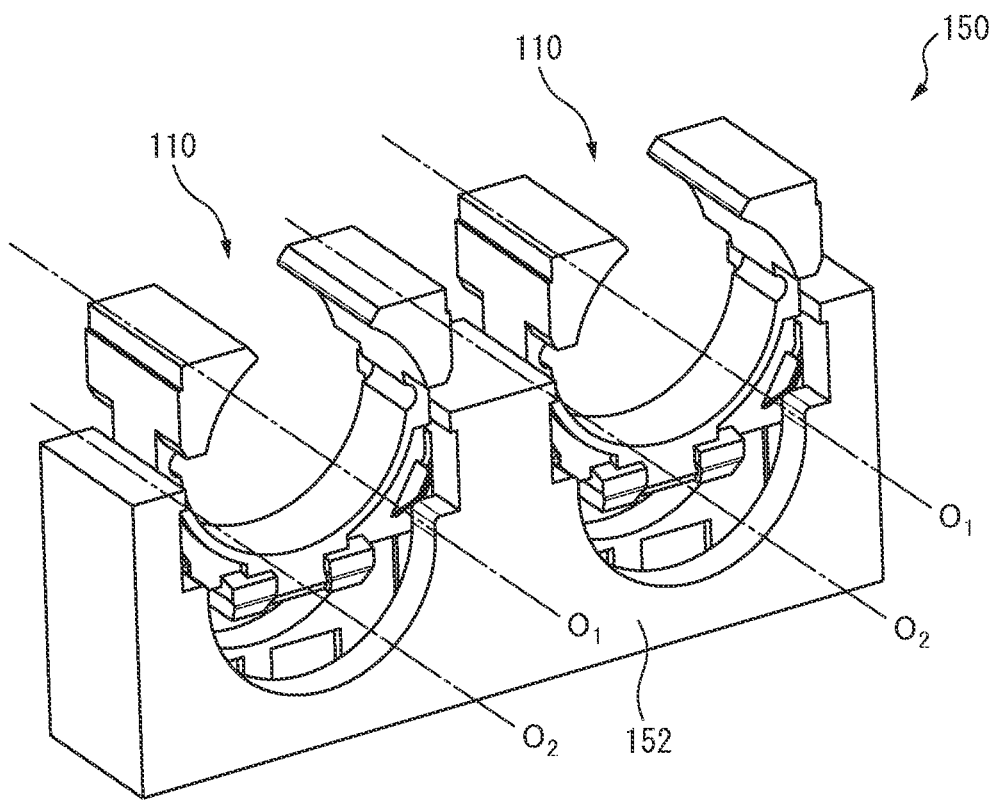
FIG. 9 is a perspective view of a clip assembly which is configured to retain two cylindrical components according to a modified example of the first embodiment.
Figure 10:
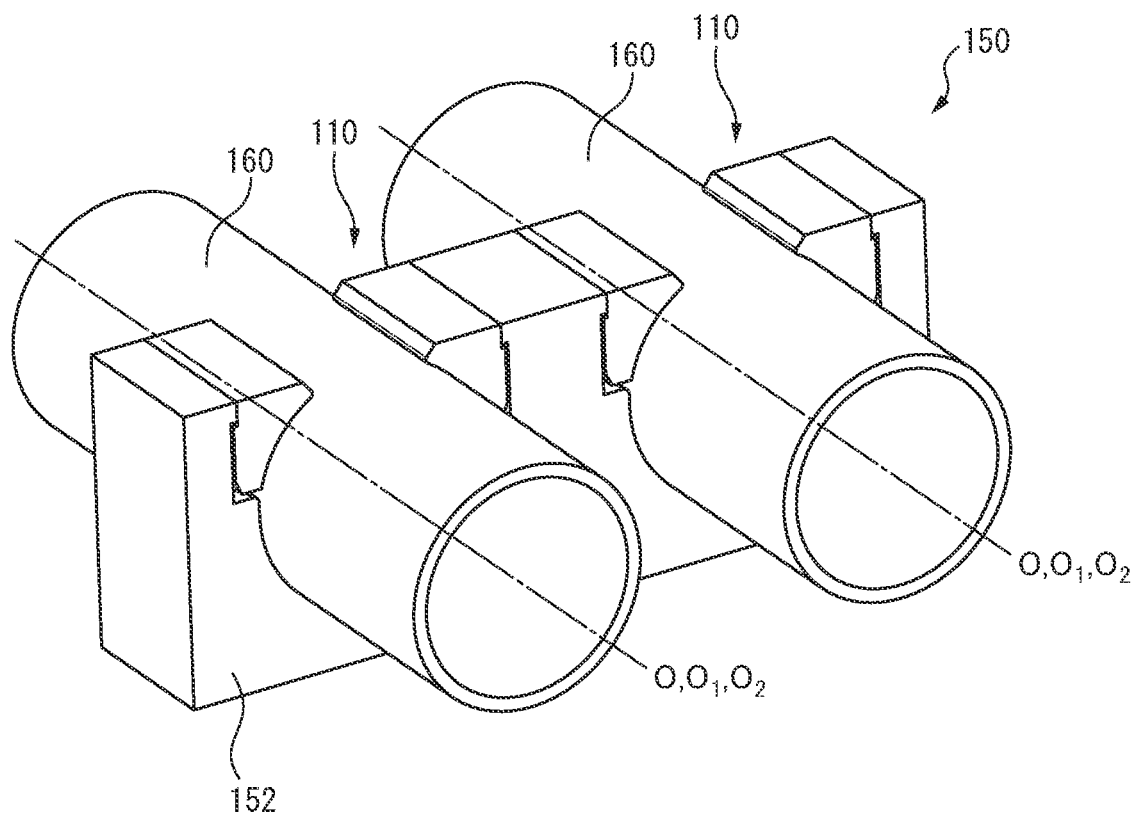
FIG. 10 is a perspective view of the clip assembly of FIG. 9 and two cylindrical components retained by the clip assembly.

Though the clip assembly 100 is configured such that a single cylindrical component 160 is retained in the embodiment described above, the present invention is not limited thereto, and the clip assembly 100 may be configured so as to retain a plurality of cylindrical components 160. In the clip assembly 150 shown in FIGS. 9 and 10, two inserts 110 are fitted into one holder 152 so that two cylindrical components 160 can be retained. Though the clip assembly 150 retains two cylindrical components 160 in FIGS. 9 and 10, the present invention is not limited thereto, and three or more inserts 110 can be fitted into one holder, and the clip assembly may be configured so as to retain three or more cylindrical components 160.

Figure 11:
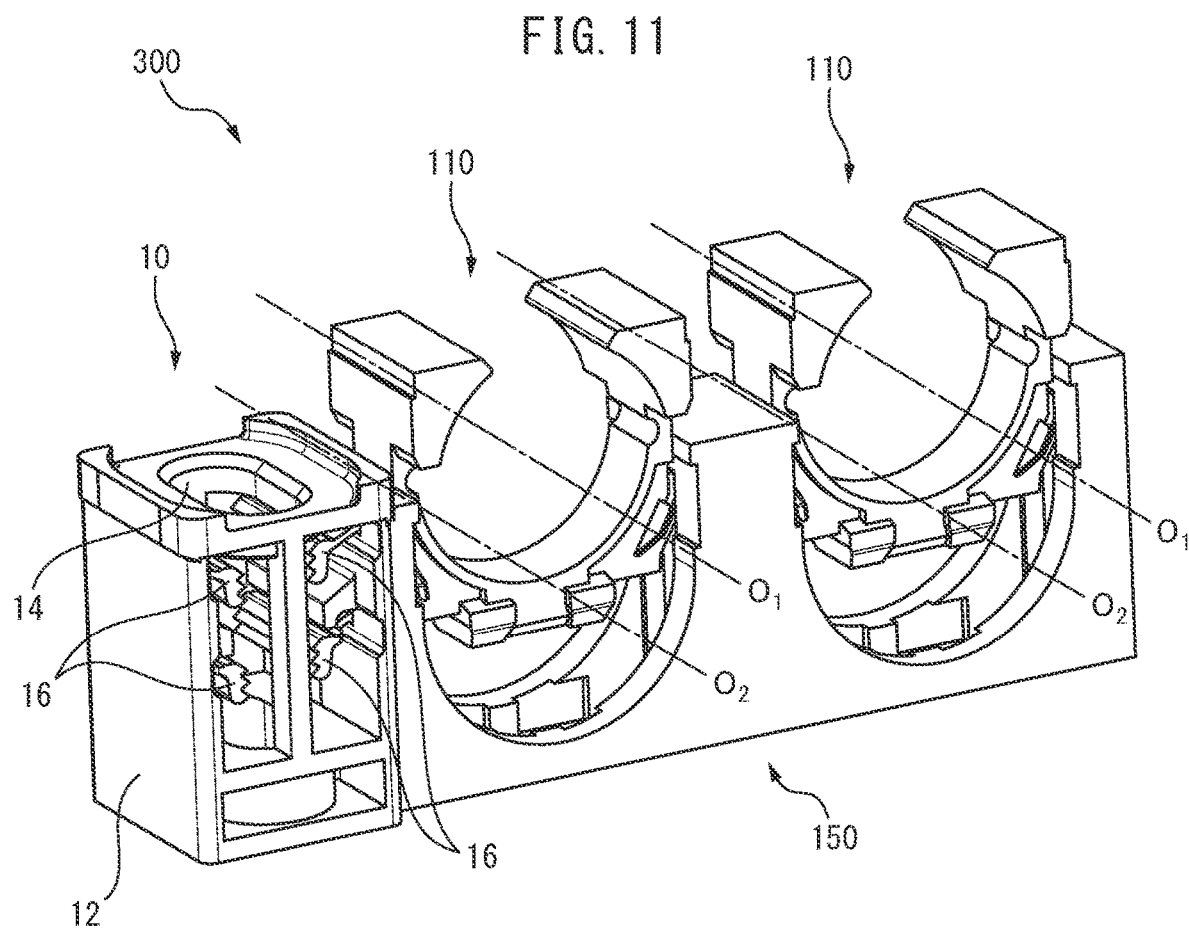
FIG. 11 is a perspective view of a clip assembly comprising an anchor according to yet another modified example of the first embodiment.
Figure 12:
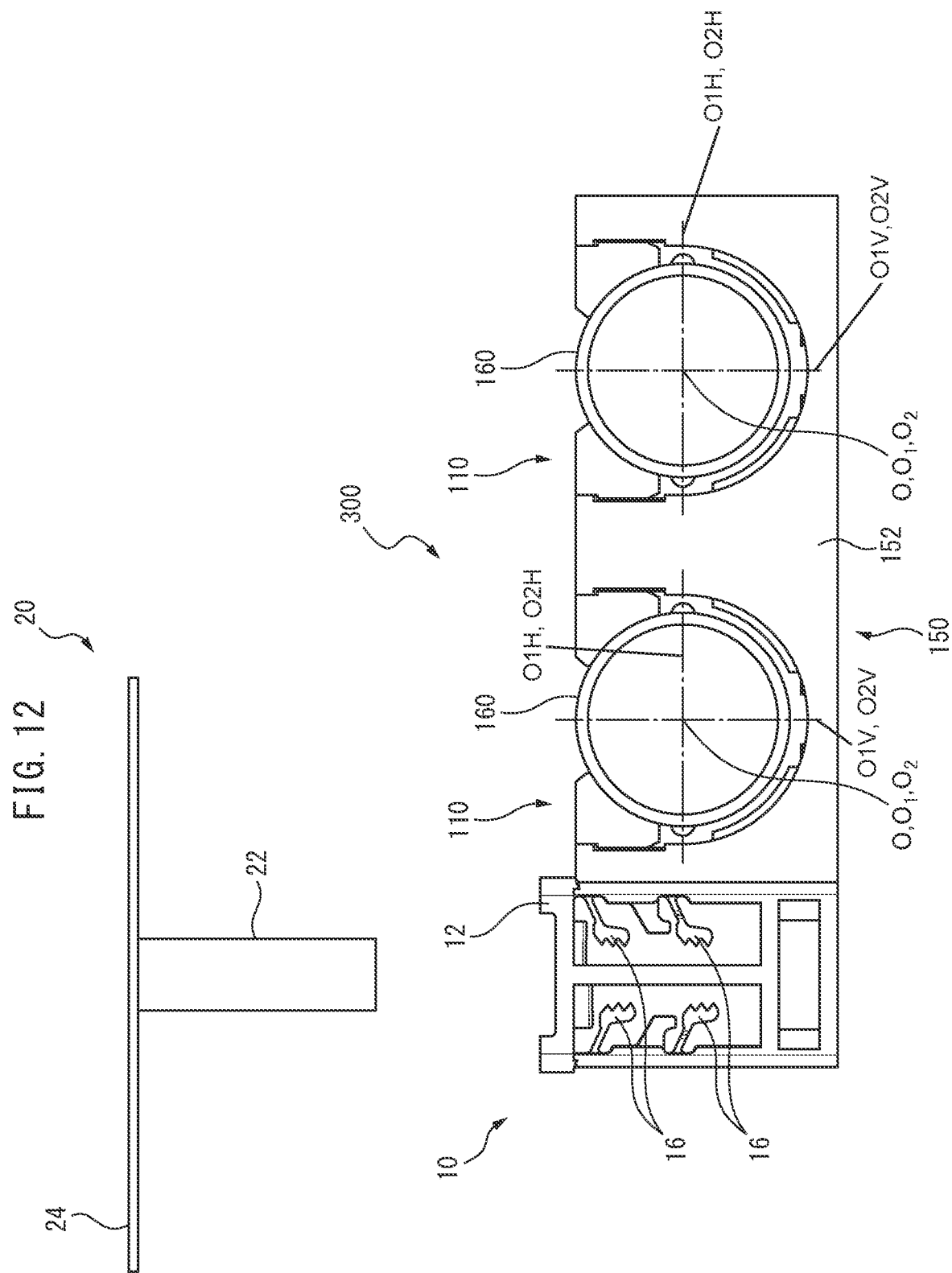
FIG. 12 is a front elevational view of the clip assembly of FIG. 11 and cylindrical components retained by the clip assembly.
Figure 13:
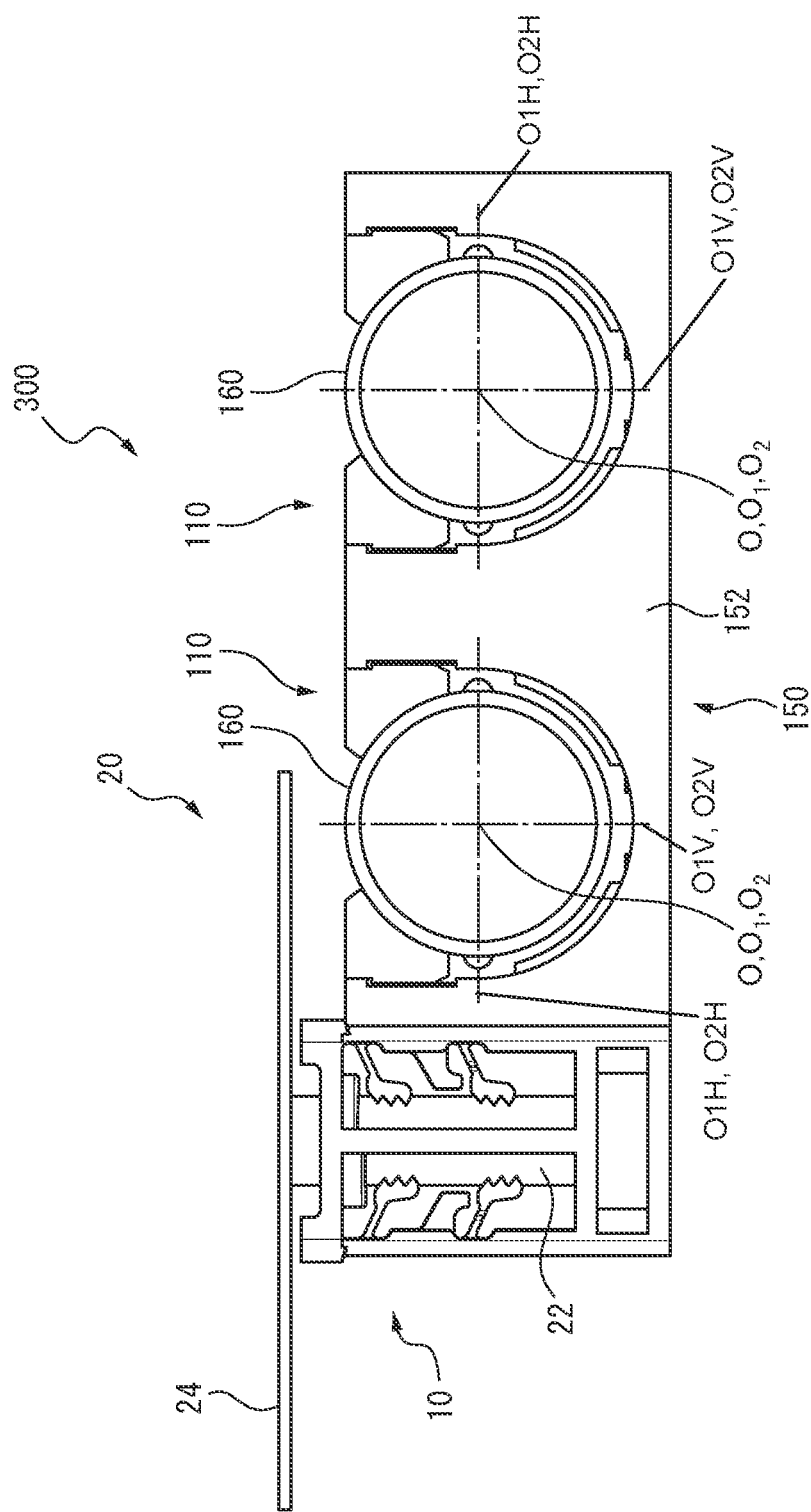
FIG. 13 is a front view of the clip assembly of FIG. 11 affixed to a stationary member such as a panel of an automobile.
Figure 14:
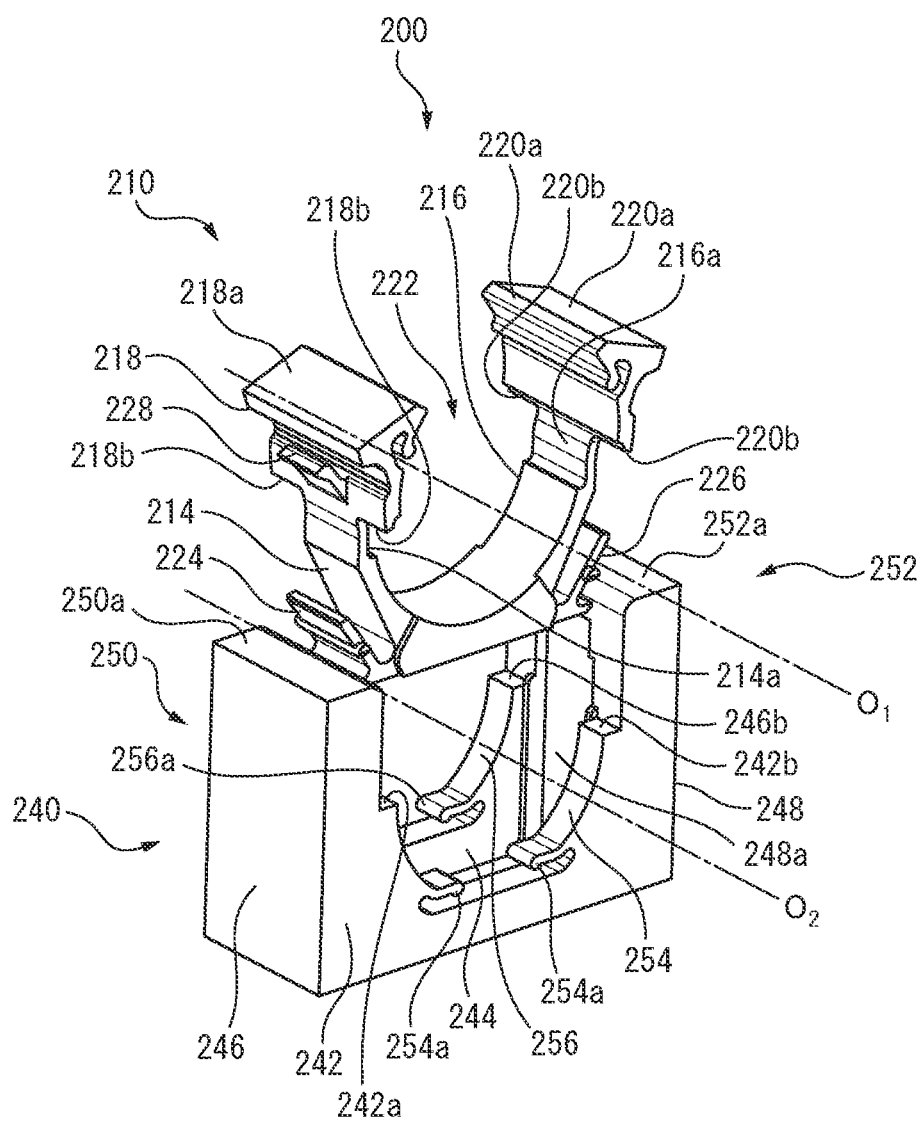
FIG. 14 is a perspective view of a clip assembly according to a second embodiment.
Figure 15:
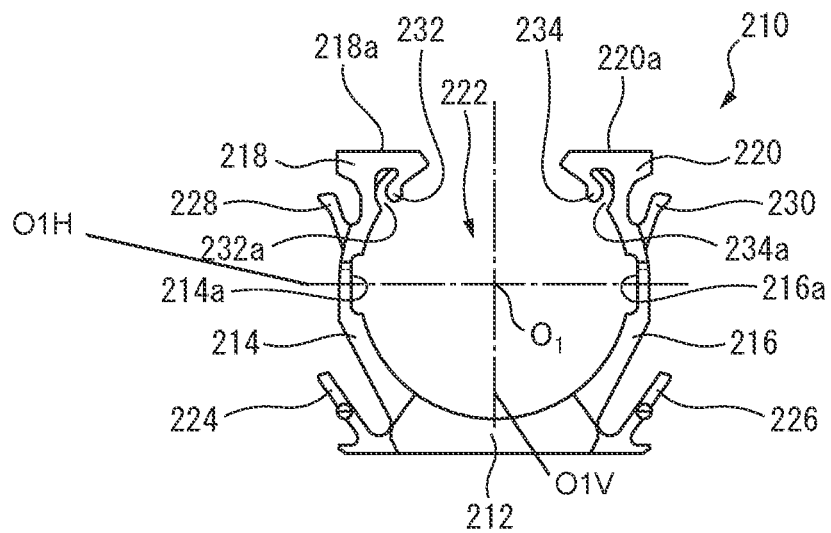
FIG. 15 is a front elevational view of an insert of the clip assembly of FIG. 14.

Further, the clip assembly of the present invention may comprise an anchor for affixation to a stationary member (not illustrated) such as a frame or panel affixed to the engine compartment of a motor vehicle. With reference to FIGS. 11 to 13, in the clip assembly 300, an anchor 10 is coupled to one side surface of the holder 152 of the clip assembly 150 shown in FIGS. 9 and 10. The anchor 10 includes a plurality of fingers 16 arranged in an outer frame 12.

The clip assembly 300 in which the cylindrical component 160 is retained is secured to a panel 24 as a stationary member by inserting a stud 22 affixed to the side surface of the panel 24 through the opening 14 formed on the upper surface of the anchor 10, so that the fingers 16 engage with the side surface of the stud 22.

Note that though the clip assembly 300 is configured so as to retain two cylindrical components 160 in the example shown in FIGS. 11 to 13, the present invention is not limited thereto, and it may be configured so as to be capable of retaining one or three or more cylindrical components.

Next, a second embodiment of the present embodiment will be described with reference to FIGS. 14 to 18.

A clip assembly 200 according to the second embodiment comprises an insert 210 and a holder 240, and is configured so as to retain a cylindrical component 160. The insert 210 and holder 240 have respective center axes O1, O2. The insert 210 is pushed in the fitting direction V with respect to the holder 240, whereby it is fitted into and integrates with the holder 240. The holder 240 can be affixed to a stationary member such as a frame or panel.

The insert 210 has a base part 212 and a pair of arms 214, 216 extending from the sides of the base part 212. The arms 214, 216 have heads 218, 220 formed at their respective tips. The insert 210 is a member having a substantially C shape with an open upper portion, and can be integrally formed from a plastic material such as polyacetal, polyamide, or polypropylene. The arms 214, 216 of the insert 210 form a retention channel 222 which retains the cylindrical component 160. Noches 214a and 216a extending in the central axis O1 direction may be formed in the inner surfaces of the arms 214, 216.

The inner peripheral surface of the retention channel 222 can be in contact with the outer peripheral surface of the cylindrical component 160 to be retained. The inner peripheral surface of the retention channel 222 can be formed from a part of a substantially cylindrical surface centered on the central axis O1. The heads 218, 220 of the arms 214, 216 contact the upper side of the outer peripheral surface of the cylindrical component 160 arranged in the channel 222, and press the cylindrical component 160 downward from above.

The base part 212 has a pair of hook parts 224, 226 which extend diagonally upward from the base part 212 symmetrically when the insert 210 is viewed from the front or the rear. The hook parts 224, 226 are arranged more outwardly than the arms 214, 216. The hook parts 224, 226 preferably extend obliquely upward from the ends of base part 212. The base part 212 does not have protrusions like the clip assembly 100 according to the first embodiment.

The heads 218, 220 are formed on the tips (upper ends) of the arms 214, 216. The heads 218, 220 project in the front-rear direction from the arms 214, 216, and are substantially T-shaped in a side view. Contact parts 218b, 220b are formed by the portions of the heads 218, 220 protruding in the front-rear direction. The inner peripheral surfaces of the heads 218, 220 are formed so as to be in contact with the peripheral surface of the cylindrical component to be retained, and form a part of the retention channel 222.

Locking fingers 228, 230 are also formed on the tips of the arms 214, 216. The locking fingers 228, 230 project obliquely upward from the tips of the arms 214, 216. The locking fingers 228, 230 are arranged more laterally outwardly than the heads 218, 220 of the arms 214, 216.

The heads 218, 220 also have flexible biasing parts 232, 234 protruding into the retention channel 222. The biasing parts 232, 234 are formed so as to project inward from the inner peripheral surfaces of the heads 218, 220 so as to contact the outer surface of the cylindrical component 160 retained in the retention channel 222. Further, exit grooves 232a, 234a extending in the central axis O1 direction are formed around the biasing parts 232 and 234 to enable the biasing parts 232, 234 to be removed from the retention channel 222 when the biasing parts 232, 234 contact the outer surface of the cylindrical component 160 retained in the retention channel 222. The flexible biasing parts 232, 234 prevent the clip assembly 200 for the cylindrical component from moving axially or circumferentially with respect to the retained cylindrical component 160.

The holder 240 has a front wall 242 and a rear wall 244 arranged in parallel, and side walls 246, 248 extending between the front wall 242 and the rear wall 244 and connecting the two. The front wall 242 and the rear wall 244 have channels 254, 256 which can contact the outer peripheral surface of the cylindrical component 160 to be retained, and are formed in a substantially U-shapes. In the present embodiment, the channels 254, 256 are formed from a part of cylindrical surfaces centered on the central axis O2 formed on the front wall 242 and the rear wall 244 and the biasing parts 254a, 256a. Stop surfaces 242a, 242b; 244a, 244b are formed on the ends of the channels 254, 256 in the circumferential direction.

Figure 18:
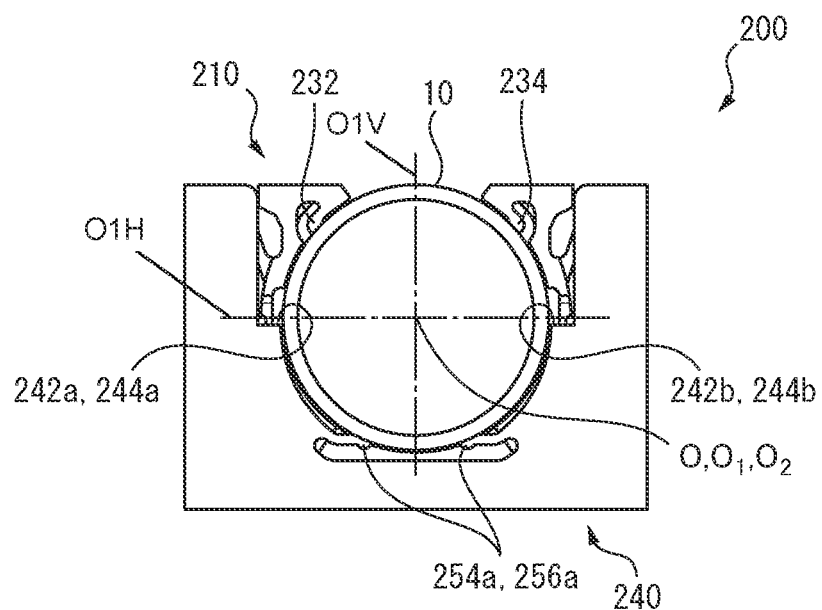
FIG. 18 is a front elevational view of a clip assembly shown along with a retained cylindrical component.

The biasing parts 254a, 256a have elasticity, contact the side surface of the cylindrical component 160 retained in the clip assembly 200, and in FIG. 18, the side surface of the lower side of the cylindrical component 160, and bias the cylindrical component 160 upwards. Thus, the biasing parts 254a, 256a extend at the bottoms of the channels 254, 256 in the direction substantially perpendicular to the fitting direction V from a part of the cylindrical surface forming the channels 254, 256. The biasing parts 254a, 256a prevent the clip assembly 200 for the cylindrical component from moving in the axial or circumferential direction relative to the retained cylindrical component 160.

The arms 250, 252 are formed by the front wall 242, the rear wall 244, and the side walls 246, 248. Grooves 246a, 248a extending in the fitting direction V perpendicular to the central axis O2 are formed in the inner surfaces of the arms 250, 252 facing each other. The end surfaces 250a, 252a of the arms 250, 252, which are the rear ends with respect to the fitting direction V, are preferably arranged in the same plane perpendicular to the fitting direction V.

In the present embodiment, the locking fingers 228, 230 engage with the walls 246b, 248b on the upper sides of the grooves 246a, 248a to form a locking part which retains the fitted state of the insert 210 and the holder 240. At this time, the locking fingers 228, 230 also bias the heads 218, 220 of the arms 214, 216 toward the cylindrical component 160 in the retention channel 222.

Figure 16:
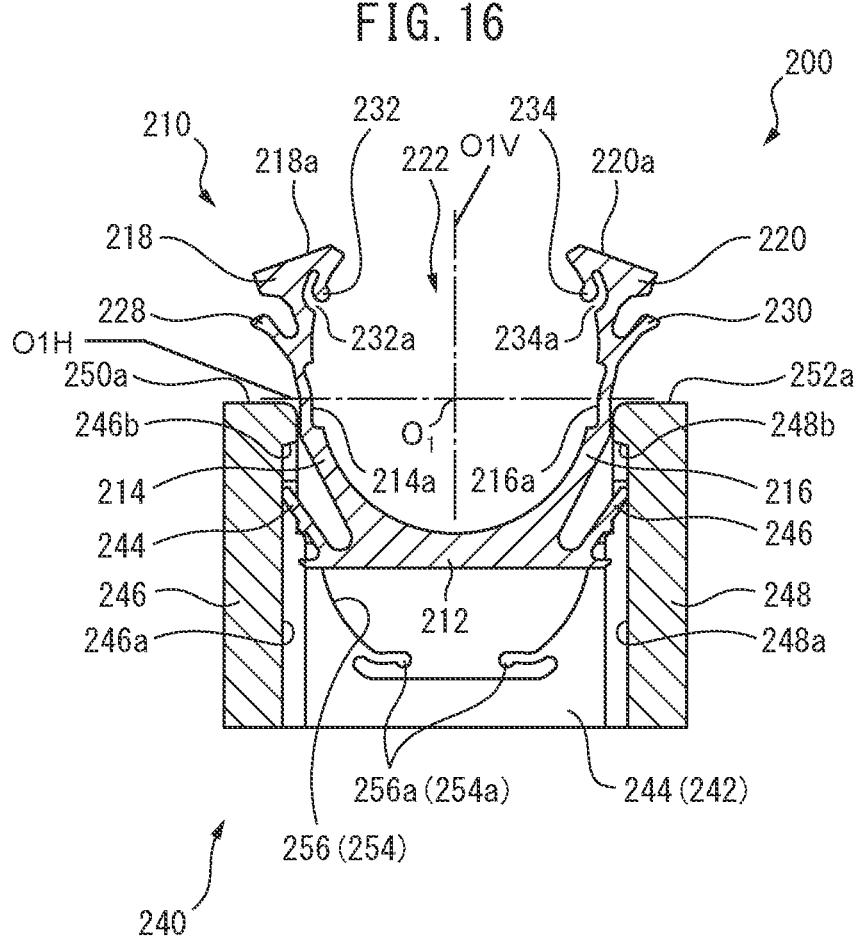
FIG. 16 is a front cross-sectional view of the clip assembly of FIG. 14.

The insert 210 is arranged between the arms 250, 252 of the holder 240, pushed in the fitting direction V, and fitted in the holder 240, as shown in FIG. 16. At that time, as in the first embodiment, the tips of hook parts 224, 226 of the insert 210 are received in the grooves 246a, 248a, and the insert 210 is positioned in the front-rear direction with respect to the holder 240. When the hook parts 224, 226 of the insert 210 are received in the grooves 246a, 248a of the holder 240, the hook parts 224, 226 are movable along the grooves 246a, 248a, but cannot move beyond the walls 246b, 248b at the upper ends of the grooves 246a, 248a to be removed from the grooves 246a, 248a, and as a result, the insert 210 cannot be separated from the holder 240.

Figure 17:
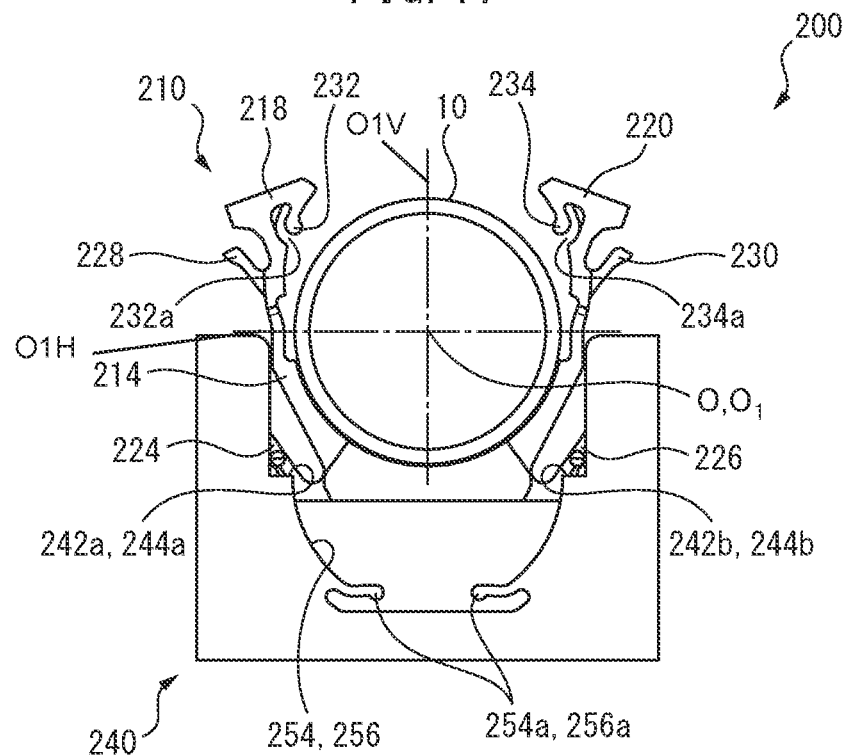
FIG. 17 is a front elevational view of a clip assembly and a cylindrical component fitted into an insert.

In this manner, the insert 210 and the holder 240 are prepared in combination, the cylindrical component 160 is arranged above the heads 218, 220 of the insert 210, the cylindrical component 160 is pressed toward the opening between the heads 218, 220 in the fitting direction V, and the cylindrical component 160 is pushed into the retention channel 222 of the insert 210 (FIG. 17). At this time, by providing the notches 214a, 216a, the arms 214, 216 can easily expand outward, and the cylindrical component 160 can be easily pushed into the retention channel 222.

When the insert 210 is further pushed in the fitting direction V together with the cylindrical component 160, the insert 210 is fitted in the holder 240 in a state in which the cylindrical component 160 is retained in the retention channel 222 thereof (FIG. 18). At this time, the contact parts 218b, 220b of the heads 218, 220 of the insert 210 contact the stop surfaces 242a, 242b; 244a, 244b of the holder 240, and the locking fingers 228, 230 engage the walls 246b, 248b on the upper ends of the grooves 246a, 248a. As a result, the arms 214, 216 of the insert 210 are affixed to the arms 250, 252 of the holder 240, respectively.

The insert 210 is fitted into and affixed in the holder 240 in this manner in a state in which the cylindrical component 160 is retained in the retention channel 222. At this time, the central axis O of the cylindrical component 160, the central axis O1 of the insert 210, and the central axis O2 of the holder 240 coincide with each other, and the inner peripheral surface of the retention channel 222 of the insert 210 coincides with the arcuate inner peripheral surface 254, 256 of the channel of the holder 240.

Furthermore, in the present embodiment, when the insert 210 and the holder 240 are fitted with each other, as shown in FIG. 17, the surfaces (rear end surfaces) 218a, 220a of the heads 218, 220 of the arms 214, 216 of the insert 210, which are the rear ends with respect to the fitting direction V, are arranged in substantially the same plane as the end surfaces 250a, 252a of the arms 250, 252 of the holder 240. Furthermore, this plane is preferably in contact with the outer surface of the cylindrical component 160 retained in the clip assembly 200.

In the present embodiment, when the insert 210 is fitted into the holder 240 in a state in which the cylindrical component 160 is received, since the entirety of the insert 210 is retained in the holder 240 so as to be biased from the outside toward the center O of the cylindrical component 160, the cylindrical component 160 can be firmly retained even if the insert 210 is formed of a flexible material.

In the present embodiment, when the entirety of the insert 210 is retained from the outside by the holder 240, since the heads 218, 220 retain the outer surface of the cylindrical component 160 (the outer surface of the cylindrical component 160 which defines the rear side when viewed in the fitting direction V) above the central axis O from above, the height of the clip assembly can be reduced.

Figure 19:
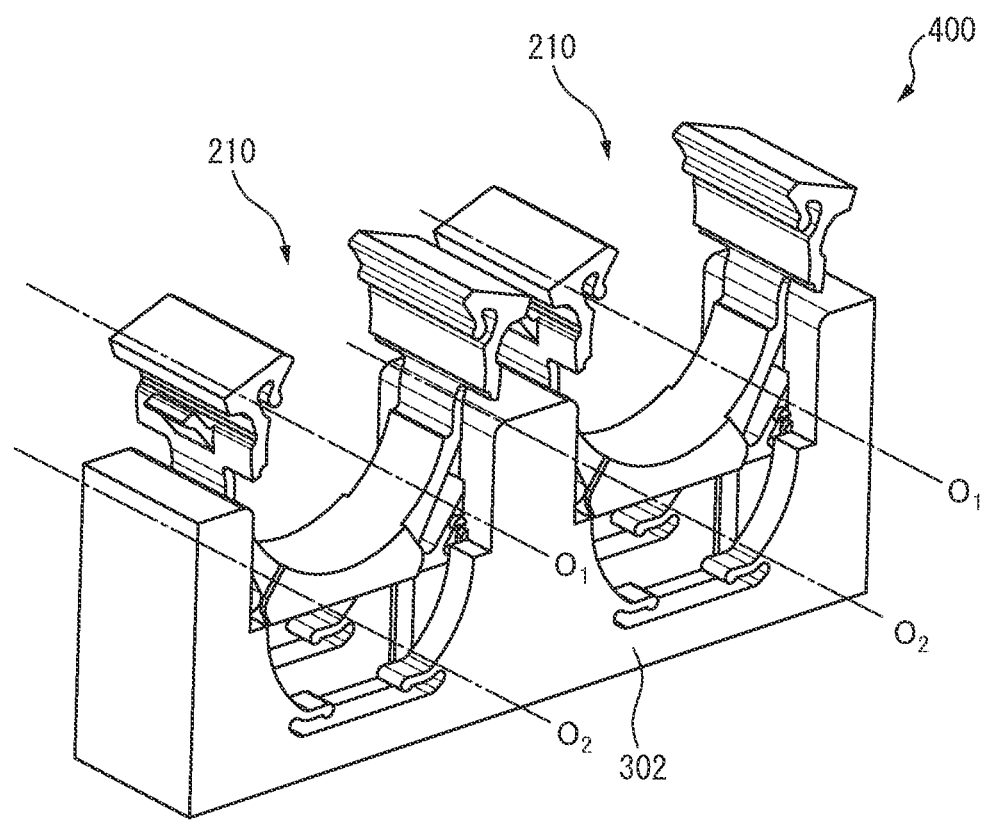
FIG. 19 is a perspective view of a clip assembly configured to retain two cylindrical components according to a modified example of the second embodiment and FIG. 20 is a perspective view of the clip assembly of FIG. 19 and two cylindrical components retained in the clip assembly.
Figure 20:
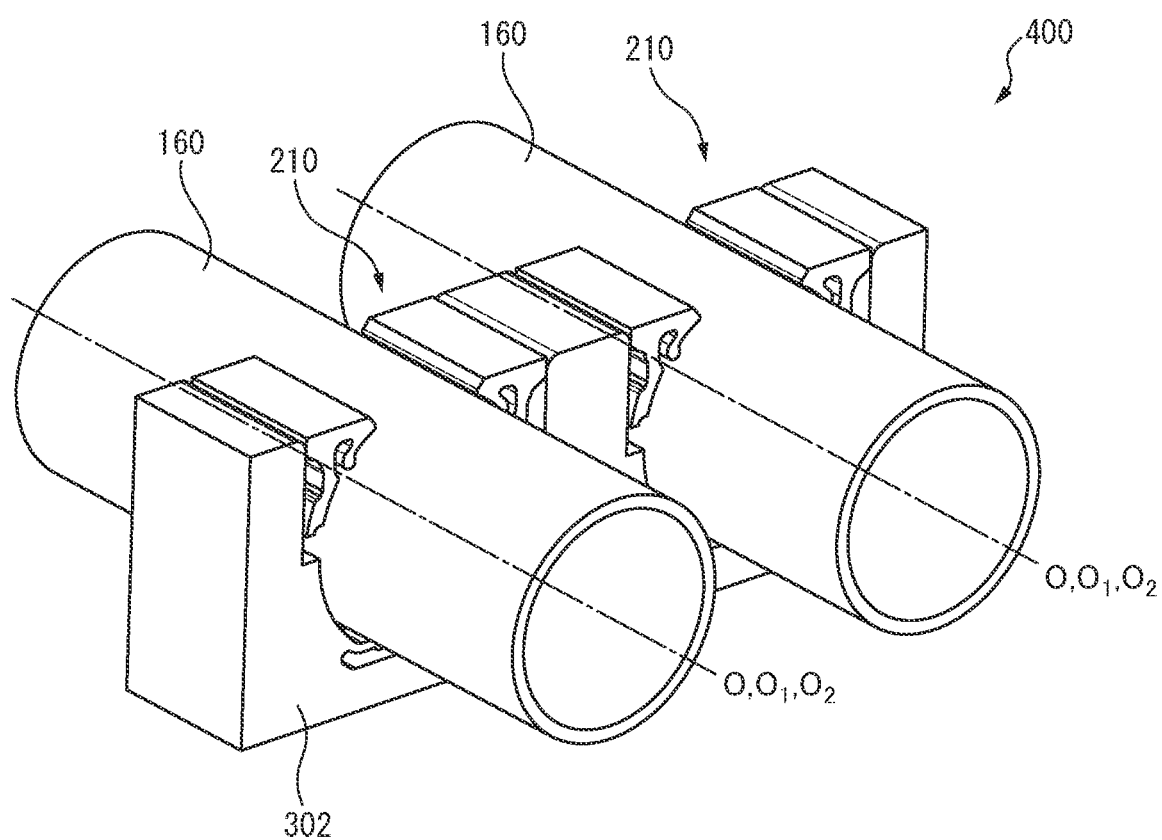

Though the clip assembly 200 is configured so as to retain a single cylindrical component 160 in the second embodiment, like the first embodiment, it may be configured so as to retain a plurality of cylindrical components 160. In the clip assembly 400 shown in FIGS. 19 and 20, two inserts 210 are fitted into one holder 402 so that two cylindrical components 160 can be retained. Note that though the clip assembly 400 is configured so as to retain two cylindrical components 160 in FIGS. 19 and 20, the present invention is not limited thereto, and three or more inserts 210 can be fitted into one holder, whereby the clip assembly may retain three or more cylindrical components 160.

Further, the clip assemblies shown in FIGS. 14 to 20 may also comprise the anchor of FIGS. 11 to 13, and can, for example, be affixed to a stationary member (not illustrated) such as a frame or panel affixed in the engine compartment of a motor vehicle.

REFERENCE SIGNS LIST

10 Anchor
12 Outer Frame
14 Opening
16 Finger
22 Stud
24 Panel
100 Clip Assembly
110 Insert
112 Base Part
112a Front Protrusion
114 Arm
114a Notch
116 Arm
116a Notch
118 Head
118a Engagement Part
118b Contact Part
118c Surface (Rear End Surface)
120 Head
120a Engagement Part
120b Contact Part
120c Surface (Rear End Surface)
122 Retention Channel
124 Hook Part
126 Hook Part
130 Holder
132 Front Wall
132a Stop Surface
132b Stop Surface
132c Front Recess
134 Rear Wall
134c Back Recess
136 Side Wall
136a Groove
136b Wall
138 Side Wall
138a Groove
138b Wall
140 Arm
140a End Surface
140b Shoulder
142 Arm
142a End Surface
142b Shoulder
144 Channel
146 Channel
150 Clip Assembly
152 Holder
160 Cylindrical Component
200 Clip Assembly
210 Insert
212 Base Part
214 Arm
214a Notch
216 Arm
216a Notch
218 Head
218a Surface (Rear End Surface)
218b Contact Part
220 Head
220a Surface (Rear End Surface)
220b Contact Part
222 Retention Channel
224 Hook Part
228 Locking Finger
230 Locking Finger
232 Biasing Part
232a Exit Groove
234 Biasing Part
234a Exit Groove
240 Holder
242 Front Wall
242a Stop Surface
242b Stop Surface
244 Rear Wall
246 Side Wall
246a Groove
246b Wall
248 Side Wall
248a Groove
248b Wall
250 Arm
250a End Surface
252 Arm
252a End Surface
254 Channel
254a Biasing Part
256 Channel
256a Biasing Part
300 Clip Assembly
400 Clip Assembly
402 Holder

The invention claimed is:

1. A clip assembly for retaining a cylindrical component, comprising:
an insert having a retention channel which accepts the cylindrical component, wherein the insert has a base and a pair of arms extending from the base, wherein the base has a pair of hook parts that extend outwardly, and wherein each arm has a head and a finger that extends farther outwardly than the head; and
a holder in which the insert is fitted, the holder has a pair of walls on an upper end, wherein the walls extend inwardly, wherein the insert and the holder are formed such that by pushing the insert into the holder in a fitting direction that is perpendicular to a central axis of the cylindrical component that is received in the channel, the insert and the holder are fitted together and the insert is retained by the holder from an outside, and
wherein the head is formed on a tip of each arm, and each head has a rear end surface that is substantially coplanar with a rear end surface of the holder when the insert and the holder are fitted to each other.

2. The clip assembly according to claim 1, wherein each head engages with an outer surface of the cylindrical component in the retention channel.

3. The clip assembly according to claim 1, wherein the hook parts engage with a pair of grooves of the holder.

4. The clip assembly according to claim 3, wherein the holder has a stop surface formed on a lower end of the pair of grooves.

5. The clip assembly according to claim 1, wherein the insert has a locking part which engages with the holder to maintain the insert and the holder in a fitted state.

6. The clip assembly according to claim 5, wherein the fingers and the hook parts of the insert extend obliquely upward.

7. The clip assembly according to claim 5, wherein the fingers of the insert engage with the walls on the upper end of the holder.

8. A clip for retaining a cylindrical component, comprising:
an insert having a retention channel that accepts the cylindrical component, the insert including:
a base;
a pair of arms each having a first end and a second end, each of the arms being connected to the base at the first end and having a finger that extends outwardly from each of the arms between the first and second ends, and wherein a gap is formed between the finger and the second end of each of the arms; and
a holder in which the insert is fitted, wherein the insert and the holder are formed such that by pushing the insert into the holder in a fitting direction that is perpendicular to a central axis of the cylindrical component that is received in the channel, the insert and the holder are fitted together and the insert is retained by the holder from an outside, and
wherein a pair of hook parts extend from the base at locations that are spaced apart from opposing peripheral ends of the base.

9. The clip assembly of claim 8, wherein the pair of hook parts extend diagonally upward from the base and in opposite directions relative to the central axis.

10. The clip assembly of claim 8, wherein the second end of each of the arms is spaced apart from the first end in a direction that is parallel with the fitting direction.

11. The clip assembly of claim 8, wherein the finger of each of the arms extends diagonally upward and in opposite directions relative to the central axis.

12. A clip assembly for retaining a cylindrical component, comprising:
an insert having a retention channel that accepts the cylindrical component, the insert including:
a central axis that defines a horizontal plane and a vertical plane perpendicular to the horizontal plane;
a base; and
a pair of arms extending from the base in a direction parallel with the vertical plane of the central axis, each of the arms having first and second ends separated by the horizontal plane of the central axis, the pair of arms being connected to the base at the first ends and having a head that extends from the second end of each of the arms, wherein the head of each of the arms includes a flat upper surface extending between an outer peripheral surface and an inner peripheral surface, wherein the inner peripheral surface is disposed diagonally relative to the vertical plane, and wherein biasing parts extend from the inner peripheral surface of the head of each of the arms, each of the biasing parts extending from the head in a direction away from the vertical plane, and
wherein the biasing parts are curved between the inner peripheral surface and a rounded tip.

13. The clip assembly of claim 12, wherein an inner surface of each of the arms includes a notch positioned adjacent the first end.

14. The clip assembly of claim 13 further comprising a holder into which the insert is fitted, the holder having a pair of sidewalls that define an opening therebetween, the opening having a first distance between upper ends of the pair of sidewalls and a second distance positioned below the upper ends of the sidewalls, wherein the second distance is greater than the first distance.

15. The clip assembly of claim 14, wherein when the insert is partially fitted into the opening of the holder, the pair of arms are displaced outwardly relative to the vertical plane.

16. The clip assembly of claim 12, wherein the biasing parts are spaced apart from the head by a crescent-shaped gap.

* * * * *